May 25, 1948.  O. H. SAMUELSON ET AL  2,442,315

BLOW HEAD FOR GLASS CONTAINER MAKING MACHINES

Filed Nov. 24, 1944

INVENTOR.
OTTO H. SAMUELSON
and ANTHONY T. ZAPPIA
BY W. P. Hahn
ATTORNEY

Patented May 25, 1948

2,442,315

UNITED STATES PATENT OFFICE 2,442,315

BLOW HEAD FOR GLASS CONTAINER MAKING MACHINES

Otto H. Samuelson, Muncie, and Anthony T. Zappia, Indianapolis, Ind., assignors to S. & Z. Manufacturing Company, Inc., Indianapolis, Ind., a corporation of Indiana Application November 24, 1944, Serial No. 564,914

11 Claims. (Cl. 49—18)

The present invention relates to blow heads, particularly adapted for blowing and internally cooling articles of glassware in the molds in which the glassware is adapted to be given its final shape.

The invention is particularly applicable for use in connection with the carrying out of certain methods and in connection with certain apparatus wherein there is delivered initially to the glassware, while the same is within the mold, sufficient fluid under pressure for shaping or blowing the article in the mold and then admitting fluid under pressure for the purpose of cooling the article after it has assumed its shape in the mold.

One of the objects of the invention is to provide a blow head for use as above, which shall be extremely simple in construction, lending itself to ready assembly and disassembly of the parts and which shall be extremely simple in its construction and operation.

A further object of the invention is the provision of a blow head having means for delivering a stream or streams of cooling air on the neck of the container to be shaped, in order to set the shaped neck rapidly and to prevent "budged finishes" on the neck.

The present application is a continuation in part of our co-pending application, Serial No. 450,538, filed July 11, 1942, resulting in Patent No. 2,363,999, and continuation in part of our co-pending application, Serial No. 460,370, filed October 1, 1942, resulting in Patent No. 2,382,028.

For the purpose of disclosing the invention, certain embodiments thereof are illustrated in the accompanying drawings, in which.

Figure 3:
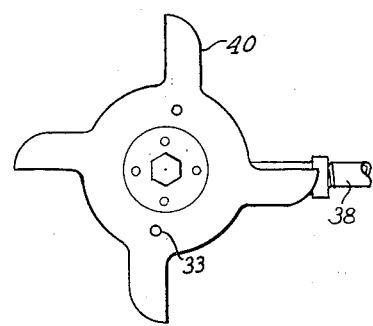
Fig. 3 is a top plan view of the structure illustrated in Fig. 2.

In the embodiments of the invention illustrated, the blow head is adapted to cooperate and be associated with a blow mold 1 adapted to receive a suitable glass blank, in the present instance a blank for shaping a bottle, which blank has a neck finish 2.

The blow head proper 4 has an air tight engagement with the mold 1 and is recessed at 5.

The inner wall of this recess is provided with an annular channel or groove 6 and the recess is provided with a liner 7 provided with perforations 8 adapted to coincide with the groove or channel 6 to provide, in effect, a series of air nozzles through which the air may be directed against the completed or finished neck of the container being molded, and perpendicular to the axis of said neck. The top of the blow head 4 is provided with a neck 9 adapted to receive the lower end of a hollow stem 10. The lower end of this stem is provided with an extension 11 adapted to pass through an enlarged portion 12 of the opening in the neck and then by giving the same a half turn the neck and the stem will be locked together, suitable pins 13 being provided to prevent rotative movement between the blow head 4 and the stem 10, under normal conditions.

The upper end of the stem 10 is internally screw-threaded to receive a hollow threaded coupling 14, the upper end of which is threaded into a T-coupling 15. Between the T-coupling 15 and the stem 10 is clamped, in position, a hollow collar 16 having an internal annular groove 17 or chamber communicating with an outlet port 18 and the interior of the coupling 14 and adapted to be connected with a suitable outlet conduit or pipe 19. This T-coupling and the collar 16 comprise a head secured to the upper end of the stem 10 and provide a head through which fluid under pressure is introduced into and permitted to escape from the article in the mold.

The T-coupling 15 receives a threaded nipple 20 of smaller diameter at its lower end than the T-coupling and having formed therein a plurality of ports 21. The lower end of this hollow nipple 20 has brazed or otherwise secured therein a downwardly extending hollow air delivery tube 22 which is of sufficient length to project into the recess 5 of the blow head, slightly beyond the same, and into the bottle in the mold 1. This tube is of smaller diameter than the stem 10 and the threaded nipple 14. The hollow nipple 20 at its lower end seats on the upper end of the threaded nipple 14 and makes a sealing joint at this point and thus providing a chamber 17' above the sealing joint. The T-coupling 15 is adapted to be connected with a suitable air supply pipe 23 in which is arranged a T-coupling 24 to which a branch air supply pipe 25 is adapted to be connected. The lower end of this supply pipe 25 connects with an elbow 26 threaded into an opening in the blow head 4 and communicating with the annular channel 6.

The top of the blow head 4 is provided with an outlet passage or port 27 which communicates with the hollow stem 10. Therefore, when a supply of blowing air is admitted from the supply pipe 23 to the T-coupling 15, this air, passing through the ports or passages 21, is delivered through the tube 22 to the interior of the blank 2 within the mold 1 for the purpose of blowing or expanding the blank within the mold to properly shape the same. At the same time through the branch pipe 25 a stream of air is delivered through the openings 8 against the shaped neck of the blank to quickly cool the same to prevent it from bulging under the air pressure which is admitted to the interior of the blank through the supply tube 22. During the blowing period, the escape of the blowing air pressure from the blank is shut off by a suitable control valve (not shown), connected with the escape pipe 19. As soon, however, as the blank has assumed its final shape under the pressure of the air under pressure admitted through the tube 22, the valve controlling the exit of air through the pipe 19 is opened so that as the air is admitted to the shaped blank it immediately escapes through the hollow stem 10, the ports 18, and through the pipe 19 to the atmosphere thereby permitting a stream of cooling air to be passed through the shaped blank for the purpose of cooling the same.

The blow head unit is suitably supported by a supporting nut 27, carried at the end of a supporting arm (not shown) and through which the stem is threaded for the purpose of vertical adjustment.

Figure 1:
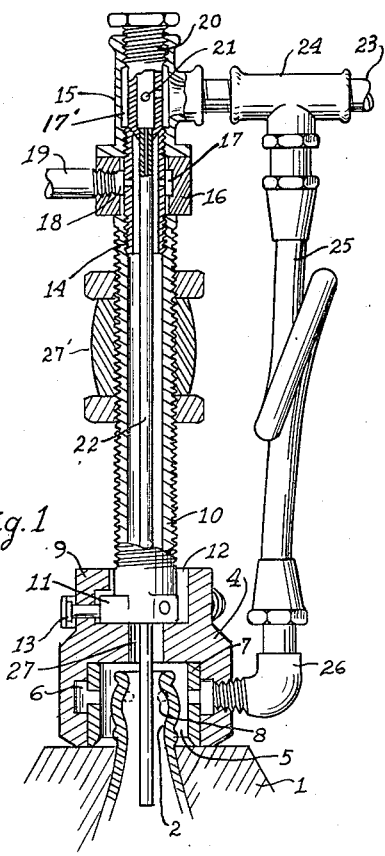
Fig. 1 is a longitudinal sectional view of a blow head embodying the subject matter of our invention.
Figure 2:
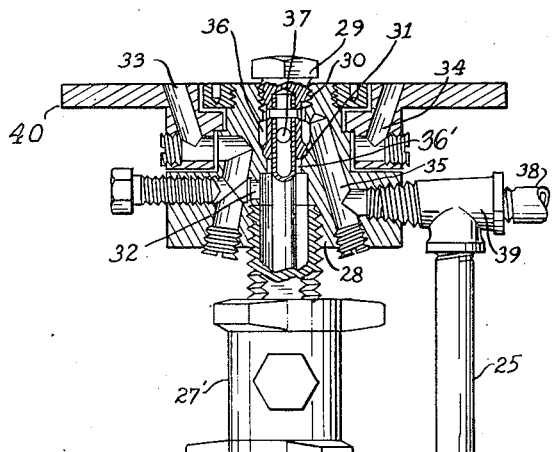
Fig. 2 is a longitudinal sectional view of a modification of the structure illustrated in Fig. 1.

In Fig. 2 we have illustrated a modification of the structure shown in Fig. 1 wherein the valve for controlling the escape of the fluid under pressure admitted to the shaped blank forms a part of the blow head unit. To this end the upper end of the stem 10 is threaded into a head 28 forming a valve body. A central opening 30 extends through the head 28, which opening at its top is closed by the hollow nipple 29 which at its lower end seats on a shoulder 31 dividing the opening into upper and lower chambers. The lower chamber 36' of the opening 30 communicates through a port 32, when the parts are rotated to a predetermined position, with an outlet port 33 in the rotating member 34 of the valve. The head 28 is provided with an inlet port 35 communicating with an annular recess or upper chamber 36 of the center opening 30 in the body, which chamber in turn communicates with the air delivery tube 22 through suitable openings 37 in the tube. This tube 22, as in Fig. 1, is secured to the end of the nipple 29. The inlet port 35 is connected with a supply pipe 38 having a T-coupling 39 therein, which T-coupling communicates, as in Fig. 1, with the annular channel 6 in the head 4.

The rotating valve member 34 of the valve is provided with a suitable star wheel 40 adapted to be operated by suitable mechanisms, to rotate the valve member 34 and place the escape opening 33 in communication with the escape port 32, at predetermined intervals. Therefore, when the rotating valve member is moved to a position to close the escape ports 32, and when the blowing fluid under pressure is admitted to the blank, this pressure cannot escape from the blank and therefore shapes the blank within the mold. As soon, however, as the rotating valve member 34 is moved to cause the ports 32 and 33 to coincide, the hollow stem 10 is placed in communication with the atmosphere so that as the air under pressure is delivered to the interior of the blank, it may escape through the hollow stem and as a result, a stream of cooling air will be delivered through the blank, and by this time has assumed its proper shape.

Figure 4:
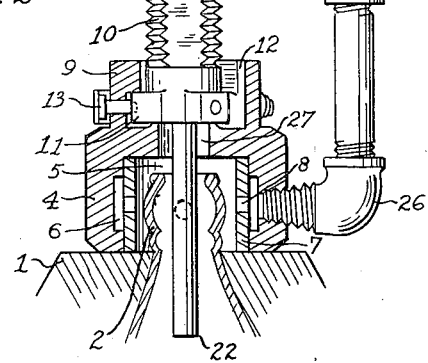
Fig. 4 shows a control valve which may be used in connection with either of the structures illustrated in Fig. 1 or Fig. 2.
Figure 4:
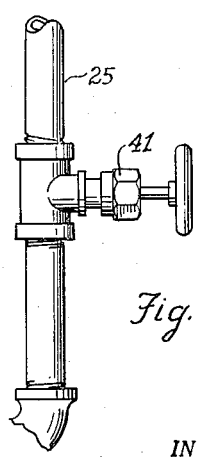

As indicated in Fig. 4, a control valve 41 may be connected in the supply pipe 25 to provide means whereby the amount of air under pressure admitted to the channel 6 and therefore to the recess 5 may be adjusted.

We claim:

1. A device for blowing and cooling articles of glassware in a mold in which the formed neck of the article is adapted to project beyond the top of the mold, comprising a blow head adapted for fluid tight engagement with the mold and having a neck receiving recess for receiving the finished neck of the article and of greater diameter than said neck, said head having fluid delivery nozzles disposed therein in a position to deliver streams of cooling fluid against the exterior of said neck at an angle to the axis of said neck, said blow head having an opening in its top for the reception of an air delivery tube.

2. A device for blowing and cooling articles of glassware in a mold in which the finished neck of the article is adapted to project above the top of the mold, comprising a blow head adapted for air tight engagement with the mold and having a neck receiving recess for receiving the finished neck of the article and of greater diameter than said neck, the wall of said recess having an annular channel formed therein and a liner for said recess having openings therein coinciding with said channel.

3. A device for blowing and cooling articles of glassware in a mold, comprising a blow head adapted for air tight engagement with the mold, said blow head having a passage therein communicating with interior of the article, a hollow stem supporting said blow head at its lower end and communicating through said passage with the interior of the article, a head secured to the upper end of said hollow stem having a part communicating with the interior of the stem and extending to the exterior of said head, a hollow nipple closing the upper end of said stem and an air delivery tube of sufficient length to project through said hollow stem through said blow head and into the article supported from the lower end of said nipple.

4. A device for blowing and cooling articles of glassware in a mold, comprising a blow head adapted for air tight engagement with the mold and having a recess therein communicating with the interior of the article, said blow head having an opening in its upper end connected with said recess, a hollow stem supporting said blow head at its lower end and communicating with said recess through said opening, a head secured to the upper end of said hollow stem having a port communicating with said hollow stem and extending to the exterior of said head, said head having an opening extending to the top thereof, a hollow nipple closing the top of said opening and an air delivery tube supported by said nipple and extending through said stem beyond the lower end of said blow head.

5. A device for blowing and cooling articles of glassware in a mold, comprising a blow head adapted for air tight engagement with the mold and having a recess communicating with the interior of the article in the mold, said blow head having an opening in its top communicating with said recess, a hollow stem supporting said blow head at its lower end and communicating with said recess through said top opening, a top head secured to the top of said stem and having two annular chambers formed therein, said top head having a port extending from one of said chambers to the exterior of the head for connection with a source of fluid supply, a hollow nipple closing the upper end of said last mentioned chamber and adapted at its lower end to seal said last mentioned chamber against communication with the other of the said chambers, an air supply tube supported by said nipple and extending downwardly through said stem a sufficient distance to project into the article in the mold, said air supply tube being adapted to communicate with said chamber closed by said nipple.

6. A device for blowing and cooling articles of glassware in a mold in which the shaped neck of the article to be formed projects above the top of the mold, comprising a blow head adapted to make air tight engagement with the mold and having a neck receiving recess of greater diameter than the neck of the article, said recess having an air delivery channel in its side wall for delivering air to the side of said neck and said blow head having an opening in the top thereof communicating with said neck receiving recess, a hollow stem supporting said blow head at its lower end and communicating through said opening with said recess, a top head secured to the upper end of said stem having a chamber therein communicating with said stem, a port extending from said chamber to the exterior of the top head, said head having a second chamber therein sealed against communication with first chamber, a connecting conduit connected with said second chamber, a branch from said conduit communicating with said channel in said blow head, an air delivery tube supported in said head, extending through said stem and of sufficient length to project into the article said second mentioned chamber communicating with said air delivery tube.

7. A device for blowing and cooling articles of glassware in a mold, comprising a blow head adapted for air tight engagement with the mold and having a recess therein communicating with the interior of the article in the mold, said blow head having an opening in the top thereof, a hollow stem supporting said blow head at its lower end and communicating through said opening with said recess, a top head secured to the top of said stem, said top head having a chamber therein communicating with the interior of said stem, a port extending from said chamber to the exterior of said top head, a second chamber in said head above said first mentioned chamber, a nipple closing the top of said second mentioned chamber and sealing said first and second mentioned chambers against communication with one another, and said nipple having communication with said second mentioned chamber and an air delivery tube connected to the lower end of said nipple, communicating therewith, and projecting through said stem and said blow head beyond the bottom of said blow head.

8. A device for blowing and cooling articles of glassware in a mold, comprising a blow head adapted for air tight engagement with the mold and having a recess therein communicating with the interior of the article in the mold, said blow head having an opening in its top, a hollow stem supporting said blow head at its lower end and communicating through said opening with said recess, a top head mounted at the upper end of said stem having a chamber therein communicating with said stem, a fluid escape port in the head extending from said chamber to the exterior of said top head, a second chamber in said head, an inlet port extending from the exterior of said top head to said second chamber, a hollow nipple closing the top of said second mentioned chamber and sealing said first and second mentioned chambers against communication with one another, an air inlet tube supported by said nipple projecting through said stem and of sufficient length to project into the article in the mold, said tube communicating with said second mentioned chamber and a rotary valve on said head and controlling said escape port in said head.

9. A device for blowing and cooling articles of glassware in a mold in which the finished neck of the article projects beyond the top of the mold, comprising a blow head adapted to make air tight engagement with the mold and having a neck receiving recess of greater diameter than the neck of the article, said recess having an air channel therein for delivering air against the sides of the neck within said blow head, a hollow stem supporting said blow head at its lower end and communicating with said recess, a top head secured to the upper end of said stem, said top head having an air chamber therein communicating with said stem and with an outlet port extending from the interior of said top head, said head having a second air chamber therein, an air inlet conduit connected with said second mentioned chamber, a branch from said air inlet conduit communicating with said channel in said blow head, a hollow nipple closing the upper end of said second mentioned chamber in the top head and sealing said first and second mentioned chambers against communication with one another, an air delivery tube supported by said nipple and communicating with said second mentioned chamber in the top head and of sufficient length to project into the article in the mold and a rotary valve supported on said head and controlling said outlet port.

10. A device for blowing and cooling articles of glassware in a mold, comprising a hollow blow head adapted for fluid tight engagement with the mold, a hollow stem supporting at its lower end said head and communicating with the interior thereof, a valve body secured to the upper end of said stem having an outlet port communicating with the interior of said stem and extending to the exterior of said body, a hollow tube having its upper end secured in said valve body and extending downwardly through said stem, said valve body having an inlet port extending from the interior of said body and communicating with said tube, and a rotary valve member on said valve body controlling the opening and closing of said outlet port.

11. A device for blowing and cooling articles of glassware in a mold, comprising a hollow blow head adapted for fluid tight engagement with the mold, a hollow stem supporting at its lower end said head and communicating with the interior of said head, a valve body having a central opening extending therethrough, said stem fitting into the bottom portion of said opening, said opening having an internal annular shoulder on its wall intermediate of the top and bottom of said valve body, a nipple removably secured in the top of said opening and having a portion engaging said annular shoulder to divide said opening into an upper and lower chamber, a hollow tube secured to said nipple and extending downwardly through said stem; said valve body having an inlet port communicating through said upper chamber with said tube, and an outlet port communicating with the lower chamber and extending to the exterior of the valve body, and a rotary valve mounted on said valve body for controlling the opening and closing of said outlet port.

OTTO H. SAMUELSON.
ANTHONY T. ZAPPIA.

REFERENCES CITED

The following references are of record in the file of this patent:

UNITED STATES PATENTS

| Number | Name | Date |
|---|---|---|
| 2,123,145 | Peiler | July 5, 1938 |

FOREIGN PATENTS

| Number | Country | Date |
|---|---|---|
| 310,421 | Great Britain | Feb. 27, 1930 |